United States Patent
Xu et al.

(10) Patent No.: US 8,611,415 B1
(45) Date of Patent: Dec. 17, 2013

(54) SYSTEM AND METHOD FOR CODING USING IMPROVED MOTION ESTIMATION

(75) Inventors: Yaowu Xu, San Diego, CA (US); Paul Wilkins, Cambridge (GB); James Bankoski, Wynantskill, NY (US)

(73) Assignee: Google Inc., Mountain View, CA (US)

( * ) Notice: Subject to any disclaimer, the term of this patent is extended or adjusted under 35 U.S.C. 154(b) by 396 days.

(21) Appl. No.: 12/946,578

(22) Filed: Nov. 15, 2010

(51) Int. Cl.
*H04N 11/02* (2006.01)

(52) U.S. Cl.
USPC .......................................................... 375/240

(58) Field of Classification Search
None
See application file for complete search history.

(56) References Cited

U.S. PATENT DOCUMENTS

| | | | |
|---|---|---|---|
| 4,924,310 A | 5/1990 | von Brandt | |
| 5,148,269 A | 9/1992 | de Haan et al. | |
| 5,337,086 A | 8/1994 | Fujinami | |
| 5,398,068 A | 3/1995 | Liu et al. | |
| 5,512,952 A | 4/1996 | Iwamura | |
| 5,731,840 A | 3/1998 | Kikuchi et al. | |
| 5,801,778 A * | 9/1998 | Ju | 375/240.15 |
| 5,886,742 A | 3/1999 | Hibi et al. | |
| 5,991,447 A | 11/1999 | Eifrig et al. | |
| 5,999,641 A | 12/1999 | Miller et al. | |
| 6,005,980 A | 12/1999 | Eifrig et al. | |
| 6,108,383 A | 8/2000 | Miller et al. | |
| 6,181,822 B1 | 1/2001 | Miller et al. | |
| 6,272,179 B1 | 8/2001 | Kadono | |
| 6,289,049 B1 | 9/2001 | Kim et al. | |
| 6,292,837 B1 | 9/2001 | Miller et al. | |
| 6,327,304 B1 | 12/2001 | Miller et al. | |
| 6,359,929 B1 | 3/2002 | Boon | |
| 6,370,267 B1 | 4/2002 | Miller et al. | |
| 6,381,277 B1 | 4/2002 | Chun et al. | |
| 6,560,366 B1 | 5/2003 | Wilkins | |
| 6,735,249 B1 | 5/2004 | Karczewicz et al. | |
| 7,027,654 B1 | 4/2006 | Ameres et al. | |
| 7,409,099 B1 | 8/2008 | Ameres et al. | |
| 7,499,492 B1 | 3/2009 | Ameres et al. | |
| 7,606,310 B1 | 10/2009 | Ameres et al. | |

(Continued)

FOREIGN PATENT DOCUMENTS

EP 0634873 B1 9/1998

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May 2003.

(Continued)

*Primary Examiner* — Joseph Ustaris
*Assistant Examiner* — Zhubing Ren
(74) *Attorney, Agent, or Firm* — Young Basile Hanlon & MacFarlane P.C.

(57) ABSTRACT

Coding using improved motion estimation may include receiving motion vectors for a first block in the frame and at least some of the blocks that are neighbors to the first block, wherein the received motion vectors are determined using a first search scheme, identifying neighboring blocks having motion vectors that are similar to the motion vector of the first block, and assigning the first block and the identified neighboring blocks to a group, determining a number of blocks in the group, and if the number of blocks in the group is greater than a predetermined number, determining an updated motion vector for at least one of the blocks in the group using a second search scheme that is different from the first search scheme.

24 Claims, 6 Drawing Sheets

(56) References Cited

U.S. PATENT DOCUMENTS

| | | | |
|---|---|---|---|
| 7,809,212 B2 | 10/2010 | Tulkki | |
| 7,978,770 B2* | 7/2011 | Luo et al. | 375/240.16 |
| 8,045,620 B2* | 10/2011 | Oshikiri et al. | 375/240.16 |
| 2001/0014124 A1* | 8/2001 | Nishikawa | 375/240.16 |
| 2002/0031272 A1 | 3/2002 | Bagni et al. | |
| 2002/0044693 A1* | 4/2002 | Ogawa | 382/236 |
| 2004/0228410 A1 | 11/2004 | Ameres et al. | |
| 2006/0018381 A1* | 1/2006 | Luo et al. | 375/240.16 |
| 2006/0062481 A1 | 3/2006 | Suvanto | |
| 2006/0285598 A1 | 12/2006 | Tulkki | |
| 2007/0009034 A1 | 1/2007 | Tulkki | |
| 2008/0002772 A1* | 1/2008 | Song et al. | 375/240.16 |
| 2008/0025390 A1* | 1/2008 | Shi et al. | 375/240.02 |
| 2010/0061444 A1 | 3/2010 | Wilkins et al. | |
| 2010/0061455 A1 | 3/2010 | Xu et al. | |
| 2010/0061461 A1 | 3/2010 | Bankoski et al. | |
| 2010/0061645 A1 | 3/2010 | Wilkins et al. | |
| 2010/0246668 A1 | 9/2010 | Rintaluoma | |

OTHER PUBLICATIONS

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

X "Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

Nokia, Inc., Nokia Research Center, "MVC Decoder Description", Telecommunication Standardization Sector, Study Period 1997-2000, Geneva, Feb. 7, 2000, 99 pp.

Series H: Audiovisual and Multimedia Systems, "Infrastructure of audiovisual services—Coding of moving video, Video coding for low bit rate communication", International Telecommunication Union, ITU-T Recommendation H.263, Feb. 1998, 167 pp.

Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.

Chen, Xing C., et al.; "Quadtree Based Adaptive Lossy Coding of Motion Vectors", IEEE 1996, 4 pp.

Wright, R. Glenn, et al.; "Multimedia—Electronic Technical Manual for ATE", IEEE 1996, 3 pp.

Schiller, H., et al.; "Efficient Coding of Side Information in a Low Bilrate Hybrid Image Coder", Signal Processing 19 (1990) Elsevier Science Publishers B.V. 61-73, 13 pp.

Strobach, Peter; "Tree-Structured Scene Adaptive Coder", IEEE Transactions on Communications, vol. 38, No. 4, Apr. 1990, 10 pp.

Steliaros, Michael K., et al.; "Locally-accurate motion estimation for object-based video coding", SPIE vol. 3309, 1997, 11 pp.

Martin, Graham R., et al.; "Reduced Entropy Motion Compensation Using Variable Sized Blocks", SPIE vol. 3024, 1997, 10 pp.

Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.

Liu, Bede, et al.; "New Fast Algorithms for the Estimation of Block Motion Vectors", IEEE Transactions on Circuits and Systems for Video Technology, vol. 3, No. 2, Apr. 1993, 10 pp.

Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.

Guillotel, Philippe, et al.; "Comparison of motion vector coding techniques", SPIE vol. 2308, 1994, 11 pp.

Orchard, Michael T.; "Exploiting Scene Structure in Video Coding", IEEE 1991, 5 pp.

Liu, Bede, et al.; "A simple method to segment motion field for video coding", SPIE vol. 1818, Visual Communications and Image Processing 1992, 10 pp.

Ebrahimi, Touradj, et al.; "Joint motion estimation and segmentation for very low bitrate video coding", SPIE vol. 2501, 1995, 12 pp.

Karczewicz, Marta, et al.; "Video Coding Using Motion Compensation With Polynomial Motion Vector Fields", IEEE COMSOC EURASIP, First International Workshop on Wireless Image/Video Communications—Sep. 1996, 6 pp.

Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.

Wiegand, Thomas, et al.; "Long-Term Memory Motion-Compensated Prediction", Publication Unknown, Date Unknown, 15 pp.

Zhang, Kui, et al.; "Variable Block Size Video Coding With Motion Prediction and Motion Segmentation", SPIE vol. 2419, 1995, 9 pp.

Chen, Michael C., et al.; "Design and Optimization of a Differentially Coded Variable Block Size Motion Compensation System", IEEE 1996, 4 pp.

Orchard, Michael T.; "Predictive Motion-Field Segmentation for Image Sequence Coding", IEEE Transactions on Circuits and Systems for Video Technology, vol. 3, No. 1, Feb. 1993, 17 pp.

Nicolas, H., et al.; "Region-based motion estimation using deterministic relaxation schemes for image sequence coding", IEEE 1992, 4 pp.

Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.

\* cited by examiner

| MV=NEW | MV=B0 | MV=B0 | MV=B0 |
|---|---|---|---|
| B0 | B1 | B2 | B3 |
| MV=B0 | MV=NEW | MV=B5 | MV=B0 |
| B4 | B5 | B6 | B7 |
| MV=B0 | MV=B5 | MV=B5 | MV=B0 |
| B8 | B9 | B10 | B11 |
| MV=NEW | MV=NEW | MV=NEW | MV=B0 |
| B12 | B13 | B14 | B15 |

| 1 | 1 | 1 | 1 |
|---|---|---|---|
| B0 | B1 | B2 | B3 |
| 1 | 2 | 2 | 1 |
| B4 | B5 | B6 | B7 |
| 1 | 2 | 2 | 1 |
| B8 | B9 | B10 | B11 |
| 3 | 4 | 5 | 1 |
| B12 | B13 | B14 | B15 |

SYSTEM AND METHOD FOR CODING USING IMPROVED MOTION ESTIMATION

TECHNICAL FIELD

The present invention relates in general to video encoding and decoding.

BACKGROUND

An increasing number of applications today make use of digital video for various purposes including, for example, remote business meetings via video conferencing, high definition video entertainment, video advertisements, and sharing of user-generated videos. As technology is evolving, users have higher expectations for video quality and expect high resolution video even when transmitted over communications channels having limited bandwidth.

To permit higher quality transmission of video while limiting bandwidth consumption, a number of video compression schemes are noted including formats such as VPx, promulgated by Google, Inc. of Mountain View, Calif., and H.264, a standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10).

These compression schemes may use different techniques to achieve compression. For example, many of these schemes use prediction techniques that predict where information contained in a portion of a first frame or first region of a frame can be found in a second frame or second region of the frame. The difference between the prediction and the portion of data in the second frame or second frame region is calculated to form a residual. One type of prediction, known as intra prediction, can be based on previously coded image samples within the current frame. Another type of prediction known as inter prediction can be based on previously coded frames ("reference frames"). One inter prediction technique, for example, can utilize block-based motion estimation and compensation. Motion estimation can involve searching for a sample region in a reference frame that, for example, closely matches a current block in a current frame. The luma and chroma samples of the matching sample region are subtracted from the current block to produce a residual that is encoded. A motion vector is also encoded that describes the position of the matching sample region relative to the position of the current block.

In some motion estimation search algorithms, there is a trade-off between the computational efficiency of the algorithm and the quality of the prediction (i.e. finding the matching region). In other words, finding the "best" matching region may come with the cost of increased computations. Conversely, decreasing the computational complexity may result in not finding the most suitable matching region.

SUMMARY

Embodiments of a method for encoding a video signal having at least one frame with a plurality of blocks each having pixels are disclosed herein. In one embodiment, the method includes receiving motion vectors for a first block in the frame and at least some of the blocks that are neighbors to the first block. The received motion vectors are determined using a first search scheme. The process also includes identifying neighboring blocks having motion vectors that are similar to the motion vector of the first block, and assigning the first block and the identified neighboring blocks to a group. Further, the process includes determining a number of blocks in the group and if the number of blocks in the group is greater than a predetermined number, determining an updated motion vector for at least one of the blocks in the group using a second search scheme that is different from the first search scheme.

In another embodiment, the method includes determining motion vectors for the plurality of blocks using a first search scheme and assigning neighboring ones of the plurality of blocks having motion vectors similar to a first motion vector to a first group. The method also includes selecting a second search scheme based on the number of blocks in the first group. Further, the method includes determining an updated motion vector for at least one of the blocks in the first group using the second search scheme.

Embodiments of an apparatus for encoding a video signal having at least one frame with a plurality of blocks each having pixels are disclosed herein. In one embodiment, the apparatus includes a memory and a processor configured to execute instructions stored in the memory to receive motion vectors for a first block in the frame and at least some of the blocks that are neighbors to the first block. The received motion vectors are determined using a first search scheme. The processor is also configured to execute instructions stored in the memory to identify neighboring blocks having motion vectors that are similar to the motion vector of the first block, and assigning the first block and the identified neighboring blocks to a group. Further, the processor is configured to execute instructions stored in the memory to determine a number of blocks in the group and if the number of blocks in the group is greater than a predetermined number, determine an updated motion vector for at least one of the blocks in the group using a second search scheme that is different from the first search scheme.

In another embodiment, the apparatus includes means for receiving motion vectors for a first block in the frame and at least some of the blocks that are neighbors to the first block. The received motion vectors are determined using a first search scheme. The apparatus also includes means for identifying neighboring blocks having motion vectors that are similar to the motion vector of the first block, and assigning the first block and the identified neighboring blocks to a group. Further, the apparatus includes means for determining a number of blocks in the group and if the number of blocks in the group is greater than a predetermined number, means for determining an updated motion vector for at least one of the blocks in the group using a second search scheme that is different from the first search scheme.

These and other embodiments will be described in additional detail hereinafter.

BRIEF DESCRIPTION OF THE DRAWINGS

The description herein makes reference to the accompanying drawings wherein like reference numerals refer to like parts throughout the several views, and wherein:

FIG. 6A is an exemplary schematic diagram of motion vector designations for blocks in a frame for processing by the motion estimation process of FIG. 5; and FIG. 6B is an exemplary schematic diagram of the blocks of FIG. 6 assigned to groups.

DETAILED DESCRIPTION

Figure 1:
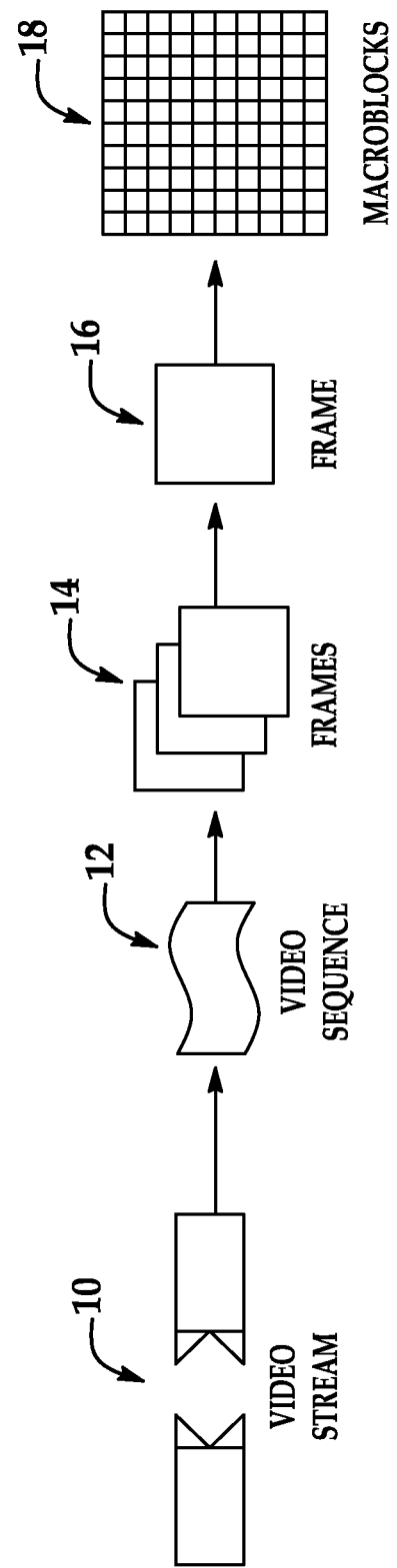
FIG. 1 is a diagram of a video bitstream.

FIG. 1 is a diagram of a video bitstream 10 to be encoded and decoded. Video coding formats, such as VP8 or H.264, provide a defined hierarchy of layers for video stream 10. Video stream 10 includes a video sequence 12. At the next level, video sequence 12 consists of a number of adjacent frames 14, which can be further subdivided into a single frame 16. At the next level, frame 16 can be divided into a series of macroblocks 18, which contain data corresponding to, for example, a 16×16 block of displayed pixels. Each of macroblocks 18 can contain luminance and chrominance data for the corresponding pixels. Macroblocks 18 can also be of any other suitable size such as 16×8 pixel groups or 8×16 pixel groups.

Figure 2:
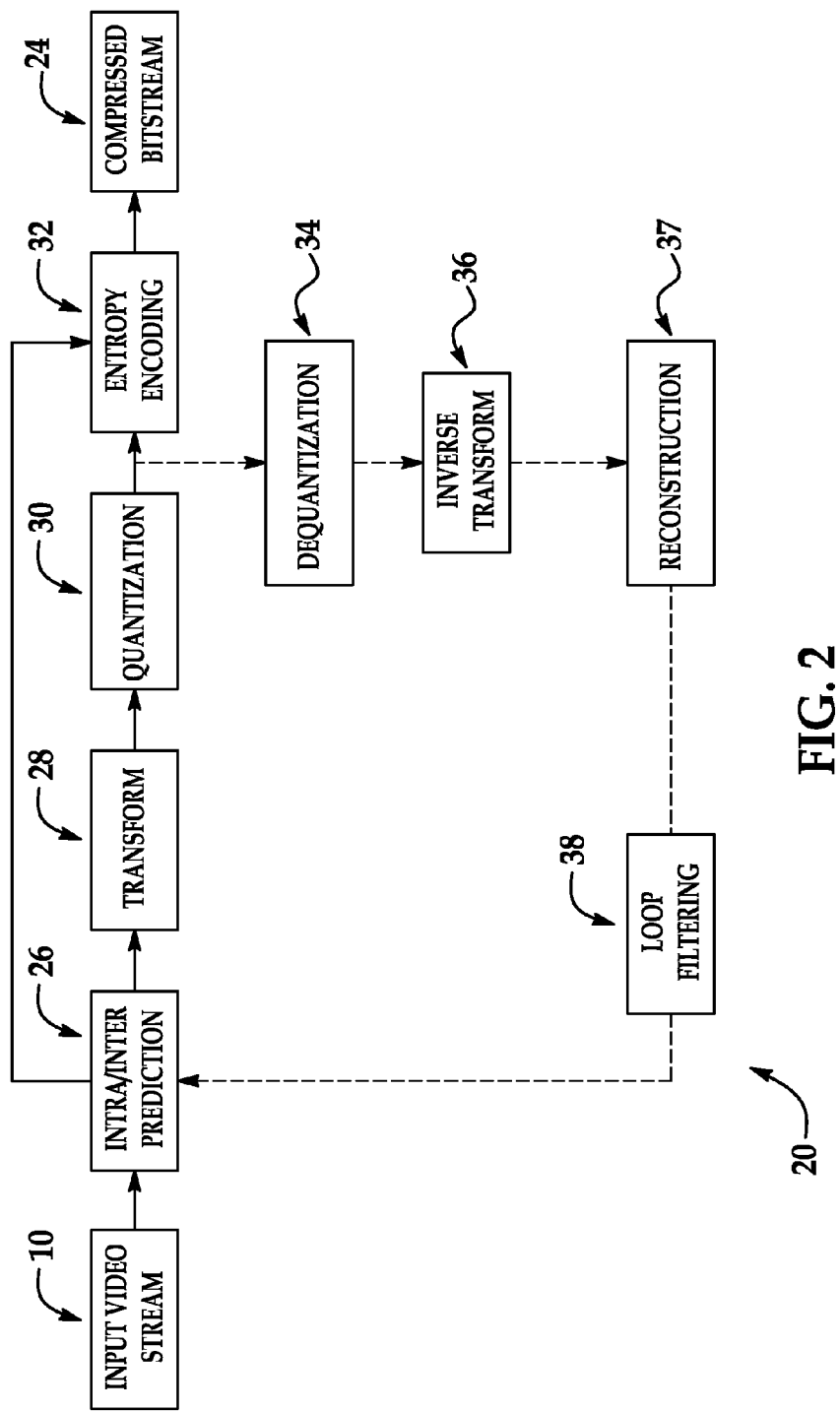
FIG. 2 is a block diagram of a video compression system in accordance with one embodiment.

FIG. 2 is a block diagram of a video compression system in accordance with one embodiment. An encoder 20 encodes an input video stream 10. Encoder 20 preferably has the following stages to perform the various functions in a forward path (shown by the solid connection lines) to produce an encoded or compressed bitstream 24: intra/inter prediction stage 26, transform stage 28, quantization stage 30 and entropy encoding stage 32. Encoder 20 also includes a reconstruction path (shown by the dotted connection lines) to reconstruct a frame for encoding of further macroblocks. Encoder 20 preferably has the following stages to perform the various functions in the reconstruction path: dequantization stage 34, inverse transform stage 36, reconstruction stage 37 and loop filtering stage 38.

When input video stream 10 is presented for encoding, each frame 16 within input video stream 10 is processed in units of macroblocks. At intra/inter prediction stage 26, each macroblock can be encoded using either intra prediction or inter prediction. In either case, a prediction macroblock can be formed. In the case of intra-prediction, a prediction macroblock can be formed from samples in the current frame that have been previously encoded and reconstructed. In the case of inter-prediction, a prediction macroblock can be formed from samples in one or more previously constructed reference frames as described in additional detail herein.

Next, still referring to FIG. 2, the prediction macroblock can be subtracted from the current macroblock at stage 26 to produce a residual macroblock (residual). Transform stage 28 transforms the residual into transform coefficients, and quantization stage 30 quantizes the transform coefficients to provide a set of quantized transform coefficients. The quantized transform coefficients are then entropy encoded by entropy encoding stage 32. The entropy-encoded coefficients, together with the information required to decode the macroblock, such as the type of prediction used, motion vectors and quantizer value, are then output to compressed bitstream 24.

The reconstruction path in FIG. 2 is present to ensure that both the encoder and the decoder use the same reference frames to decode the macroblocks. The reconstruction path performs functions that are similar to functions that take place during the decoding process that are discussed in more detail below, including dequantizing the transform coefficients at a dequantization stage 34 and inverse transforming the dequantized transform coefficients at an inverse transform stage 36 in order to produce a derivative residual macroblock (derivative residual). At reconstruction stage 37, the prediction macroblock that was predicted at prediction stage 26 can be added to the derivative residual to create a reconstructed macroblock. A loop filter 38 can then be applied to the reconstructed macroblock to reduce blocking distortion.

Other variations of encoder 20 can be used to encode bitstream 24. For example, a non-transform based encoder can quantize the residual signal directly without transform stage 28. In another embodiment, an encoder may have quantization stage 30 and dequantization stage 34 combined into a single stage.

The encoding process shown in FIG. 2 can include two or more iterations or "passes" of processing the video data. For example, a first pass can be carried out by encoder 20 using an encoding process that is less computationally intensive, and that gathers and stores information about input video stream 10 for use in a second pass. In the second pass, encoder 20 can use this information to optimize final encoding of input video stream 10. For example, encoder 20 can use this information to select parameters for encoding, key-frames and coding modes used to encode macroblocks 18, and to allocate the number of bits used to encode each frame. The output of the second pass can be final compressed bitstream 24.

Figure 3:
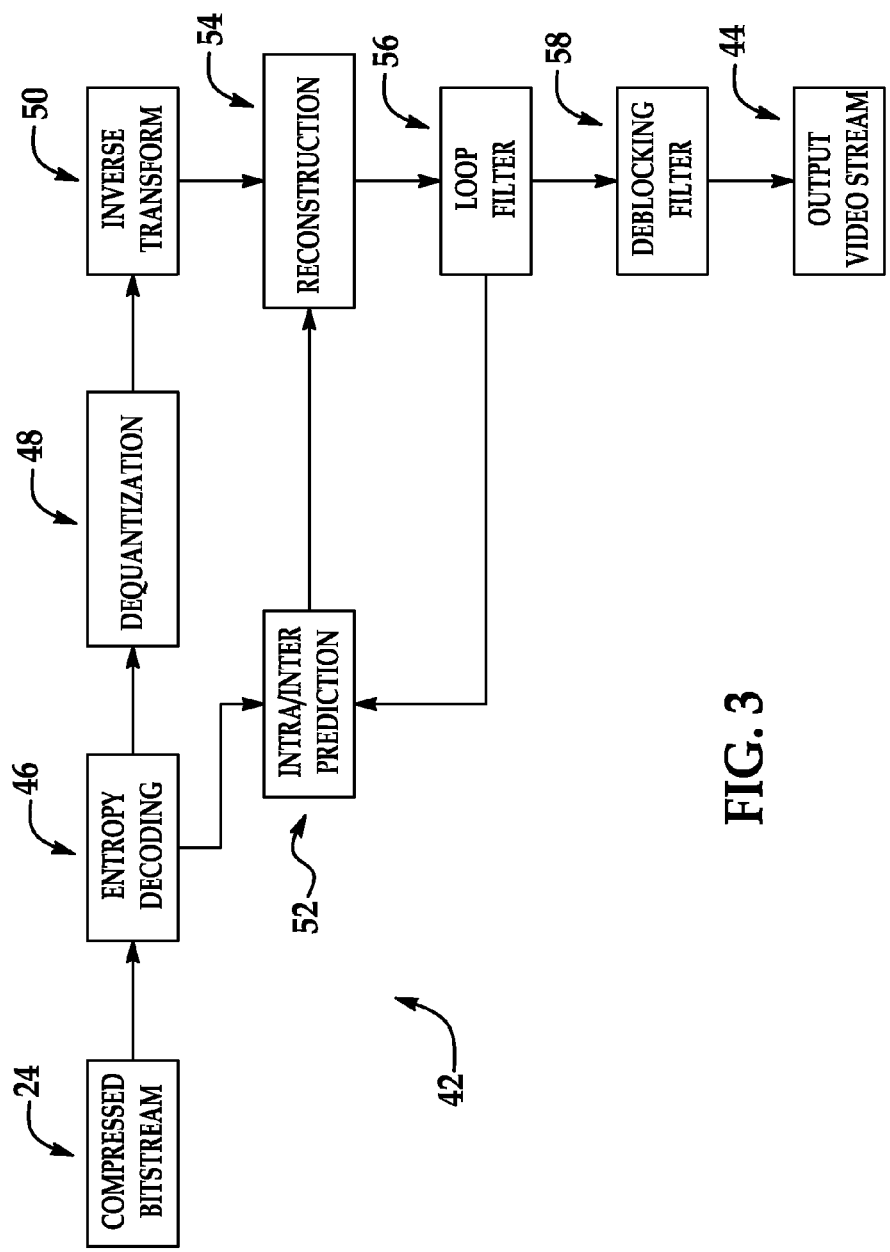
FIG. 3 is a block diagram of a video decompression system in accordance with another embodiment.

The coding mode can be used to indicate which motion vector should be used for a block in the second pass. For example, the coding mode can indicate that a new motion vector should be calculated for the block. Alternatively, the coding mode can indicate that the motion vector belonging to a neighboring block should be used, or that no motion vector (i.e., a zero motion vector) should be used. Other suitable coding modes are also available. For example, other coding modes can indicate that the motion vector from the block above, the block below, or the block to the left or the right should be used as the motion vector for the current block FIG. 3 is a block diagram of a video decompression system or decoder 42 to decode compressed bitstream 24. Decoder 42 similar to the reconstruction path of the encoder 20 discussed previously, preferably includes the following stages to perform various functions to produce an output video stream 44 from compressed bitstream 24: entropy decoding stage 46, dequantization stage 48, inverse transform stage 50, intra/inter prediction stage 52, reconstruction stage 54, loop filter stage 56 and deblocking filtering stage 58. Other structural variations of decoder 42 can be used to decode compressed bitstream 24.

When compressed bitstream 24 is presented for decoding, the data elements within compressed bitstream 24 can be entropy decoded by entropy decoding stage 46 (using, for example, Context Adaptive Binary Arithmetic Decoding) to produce a set of quantized transform coefficients. Dequantization stage 48 dequantizes the transform coefficients, and inverse transform stage 50 inverse transforms the dequantized transform coefficients to produce a derivative residual that can be identical to that created by the reconstruction stage in the encoder 20. Using header information decoded from the compressed bitstream 24, decoder 42 can use intra/inter prediction stage 52 to create the same prediction macroblock as was created in encoder 20. At reconstruction stage 54, the prediction macroblock can be added to the derivative residual to create a reconstructed macroblock. Loop filter 56 can be applied to the reconstructed macroblock to further reduce blocking artifacts. Deblocking filter 58 can be applied to the reconstructed macroblock to reduce blocking distortion, and the result is output as output video stream 44.

Other structural variations of decoder 42 can be used to decode compressed bitstream 24. For example, a decoder may produce output video stream 44 without deblocking filtering stage 58.

Figure 4:
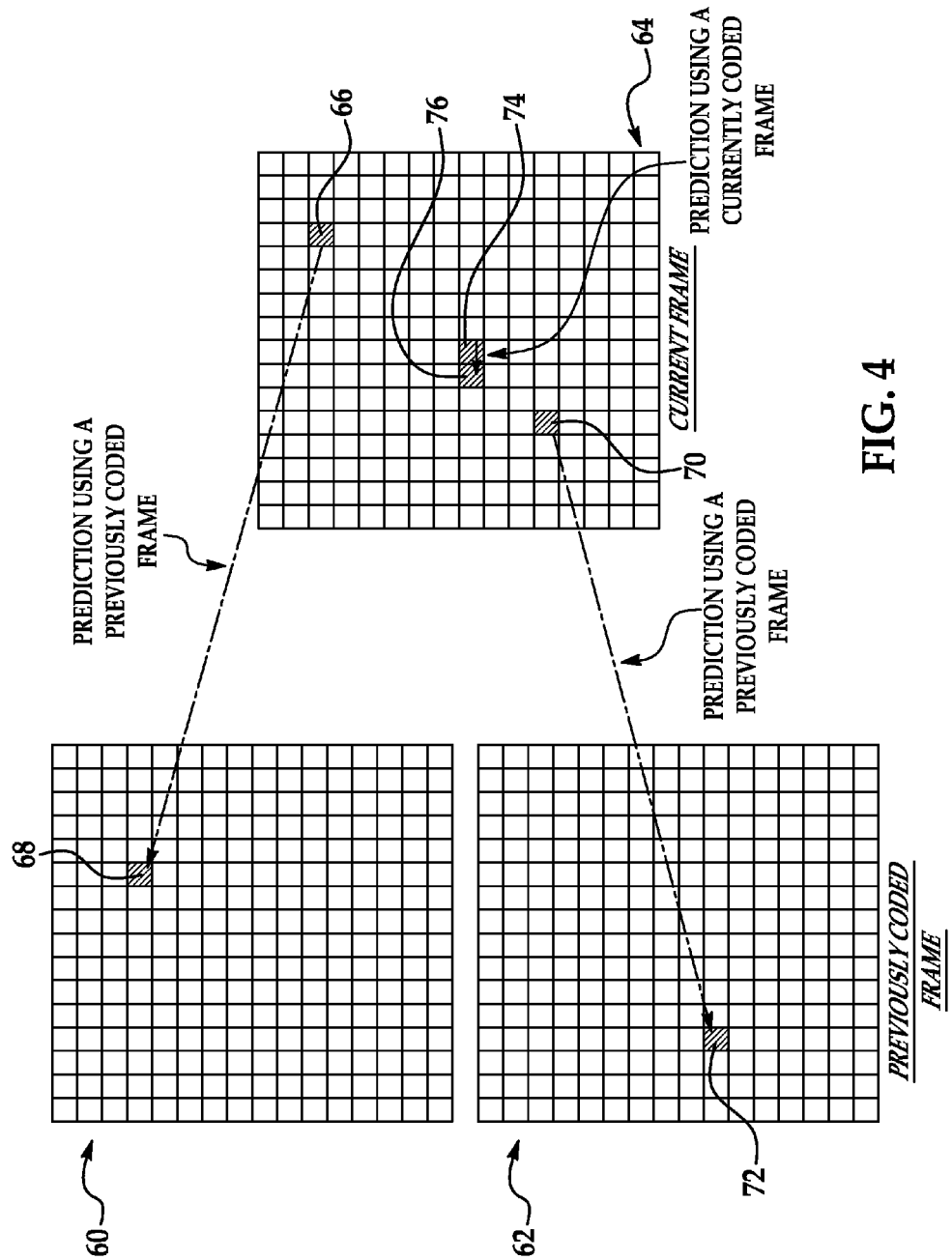
FIG. 4 is a schematic diagram of intra-prediction and inter-prediction modes used in the video compression and decompression systems of FIGS. 2 and 3.

FIG. 4 is a schematic diagram of intra prediction and inter prediction. As illustrated, FIG. 4 shows reference frames 60, 62 and a current frame 64 that is currently being encoded or decoded. As discussed previously, each frame can be processed in units of macroblocks at intra/inter prediction stage 26 or intra/inter prediction stage 52 and each macroblock can be coded using either intra prediction, inter prediction or some combination of inter prediction and intra prediction. For example, a current macroblock 66 is shown being encoded or decoded using inter prediction from a macroblock 68 from previously coded reference frame 60. Similarly, a current macroblock 70 is shown being encoded or decoded using inter prediction from a macroblock 72 from previously encoded reference frame 62. Also, for example, a current macroblock 74 is shown being encoded or decoded using intra prediction from a macroblock 76 within current frame 64.

Hereafter, the embodiments will be described using the term "blocks" which includes macroblocks as described previously. Blocks, like macroblocks, can be of any suitable size.

Inter prediction can utilize block-based motion estimation to compensate for movement of blocks each having, for example, M×N samples (e.g. 16×16) in the current frame. To predict the position of a current block (e.g. current block 70) in a current frame (e.g., frame 64), an area can be searched in a reference frame (e.g., previously coded frame 62) to find a best-matching block. The searched area or search window can be a region in the reference frame that is centered about the same coordinates as the current block in the current frame that is extended by a maximum displacement R. As such, the search window can have an area of (2R+M)×(2R+N). Block-based motion estimation is the process of using a search scheme to find the best-matching block in the search window on the basis of a matching criterion. In some instances, the matching criterion is a measure of error between a block in the search window and the current block, and the best matching block is a block in the search window that has the lowest measure of error. For example, the measure of error can be the mean squared error, mean absolute difference or, normalized cross-correlation function between the current block and the search window block. Other matching criteria are also possible.

The displacement between the current block and the best-matching block is saved as a motion vector for the current block. Subsequently, the best-matching block (i.e. the predictor) is subtracted from the current block to form the residual block. As discussed previously, both the residual block and the motion vector can be further processed and compressed (e.g., through transformation, quantization, and entropy encoding).

Both performance (i.e. computational complexity or intensity) and accuracy (i.e. prediction quality) are important characteristics of motion estimation. Different parameters can affect the performance and/or accuracy, including, but not limited to the type of matching criterion, number of search locations, pixel level search granularity, and the maximum displacement in the search range. Other parameters are also possible.

In regard to the type of matching criteria, for example, more precise error calculations may involve a large amount of computation but can also provide a more accurate predictor (i.e. best matching block). On the other hand, less precise error calculations may involve fewer computations but may not provide the best predictor.

In regard to number of search locations, for example, more search locations can provide a more accurate predictor at the cost of increased computation while less search locations can provide a less accurate predictor using fewer computations.

In regard to the maximum displacement, a small range (i.e. smaller search window) may result in poor predictors (e.g., for fast moving blocks). Conversely, a larger search range (i.e. larger search window can result in better predictors, but also can be more computationally complex.

In regard to search accuracy, search schemes done at pixel level granularity can involve less computation but may not yield the best predictors. On the other hand, searching interpolated sample positions at sub-pixel level granularity (e.g., at ½, ¼, etc. pixel levels) can yield better predictors but can also increase processing.

As discussed previously, the encoding process can include two (or more) passes of processing the video data. In the first pass, a less sophisticated motion estimation search can be performed to obtain motion estimation information for each block within each of the frames. Embodiments of the present invention provide techniques to increase the accuracy of the predictor during the second (or subsequent) pass without unduly increasing computational processing by using information from the first (or previous) pass. In some embodiments, the disclosed techniques increase the accuracy of the predictor and either maintain or decrease the overall computational processing during encoding.

Figure 5:
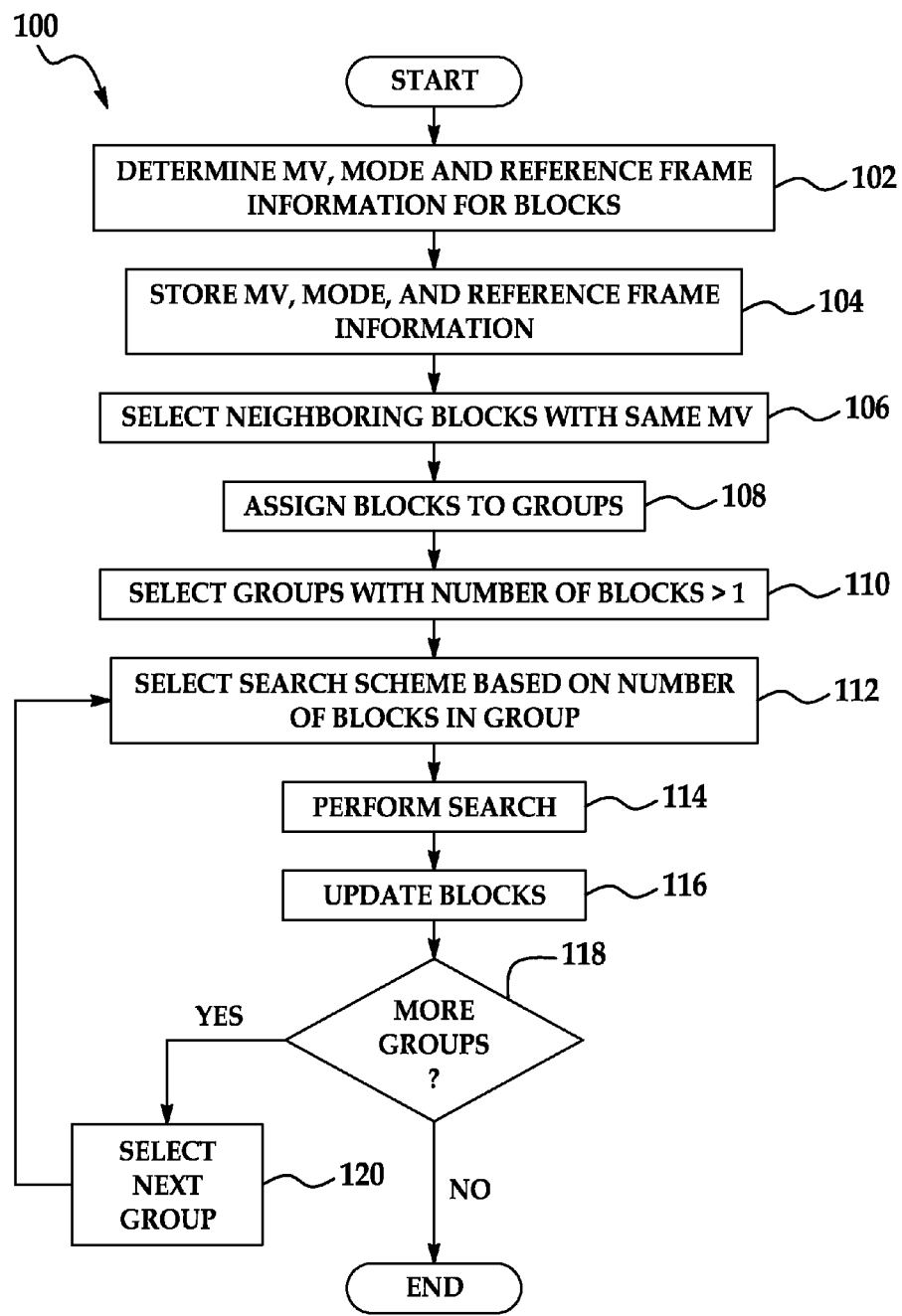
FIG. 5 is an exemplary process of motion estimation for use by the video compression system of FIG. 2.

FIG. 5 is an exemplary process 100 of motion estimation for use by, for example, encoder 20. During a first pass, motion vectors, a coding mode and a reference frame (collectively, "motion estimation information") can be determined for each block in a frame (102). As discussed previously, the motion estimation search scheme can be less sophisticated during the first pass and can obtain a coarse measurement of the motion vector. For example, during the first pass, a search scheme can be used that employs pixel level searches on a smaller search window at a smaller number of search locations.

One exemplary search scheme that can be performed is a three-step search. The three-step search is a hierarchical search where, for example, eight positions around a center position are tested and the position of minimum error (or other matching criterion) becomes the center position for the next step of the search. For a center [x, y] and offset size s, the positions [x−s, y−s], [x−s, y], [x−s, y+s], [x, y−s], [x, y], [x, y+s], [x+s, y−s], [x+s, y], [x+s, y+s] are examined in each step of the search. After each step, the offset size can be reduced. The maximum displacement can be ±7 pixels in both directions with offsets of 4, 2 and 1 in each of the three steps of the search. Other variations of the three-step search are also available. Further, other search schemes are available and can be used in lieu of or in addition to the three-step search. For example, another search is the four-step search.

In another embodiment, some or all of the motion estimation information can be determined for each block in a frame by receiving this information from an external source. The external source can be, for example, a specialized hardware device (e.g. video encoding chip) that can perform motion estimation. The external source can also be a generic hardware device such a graphics card that can perform motion estimation. Motion estimation information can also be generated during software preprocessing in a software system external to encoder 20. The motion estimation information can also be obtained from another stage of video processing. For example, motion estimation can be produced during video segmentation or content analysis. Motion estimation information can also be obtained during another decoding process. For example, if an encoded video stream is decoded in one format (e.g. MPEG-4), and it is desirable to re-encode the video stream into another format (e.g. VP8), the motion estimation information can be obtained during the MPEG-4 decoding process. Other external sources capable of providing motion estimation information are also available.

Once the motion information has been determined, information obtained from the first pass of the search is stored for use during the second or subsequent pass (104). Information that is stored for each block can include, for example, the motion vectors, reference frame selection (i.e. last frame, golden frame, alternate frame, etc.) and a coding mode selection.

Once the information has been stored during the first pass, neighboring blocks having same or similar motion vectors are identified (106). Similar motion vectors also include motion vectors that are the same. In one implementation, the motion vectors for two neighboring blocks are considered to be similar when the distance between the motion vectors is less than some threshold distance. Other similarity measures are also possible. Neighboring blocks can include adjacent blocks and/or non-adjacent blocks. For example, a neighboring block can be a block located within a predetermined number of blocks from a current block. The predetermined number of blocks can be any suitable number, such as within three blocks from another block.

After neighboring blocks with the same or similar motion vector have been identified, the blocks are assigned to one or more groups (108). Through this process, all neighboring blocks having the same or similar motion vector are assigned to the same group. Similarly, all blocks with unique motion vectors are assigned to their own individual groups. It should be noted, however, that in some embodiments blocks having unique motion vectors are not assigned to any group. In other embodiments, blocks are assigned to a group only when more than a predetermined number of blocks share the same or a similar motion vector. For example, blocks can be assigned to a group only if more than 5 blocks share the same or similar motion vectors. Other grouping techniques are also possible.

FIG. 6A is an exemplary schematic diagram showing the assignment of motion vectors for blocks B0-B15 in a frame 200. To ease the reader's understanding, frame 200 has been simplified to include only 16 blocks, though any number of blocks can be included. As illustrated, block B0 contains a new motion vector (MV). Blocks B1-B3, B4, B7, B8, B11 and B15 all have motion vectors that are the same or similar to the motion vector of block B0, and are therefore assigned the motion vector from block B0. Thus, the coding mode for B0 can be a new motion vector and the coding mode for the blocks re-using the motion vector from block B0 can be, for example, nearest or near. Similarly, block B5 contains a new motion vector, and blocks B6, B9 and B10 have motion vectors that are the same or similar to the motion vector of block B0, and are therefore assigned the motion vector from block B5. Each of blocks B12, B13 and B14 all have new motion vectors that are not used by any other blocks.

FIG. 6B is an exemplary schematic diagram showing the assignment of blocks B0-B15 of FIG. 6A to groups. As illustrated, frame 200 includes 5 distinct groups of blocks. Blocks B0-B3, B4, B7, B8, B11 and B15, which share the motion vector for block B0, are assigned to group 1. Blocks B5, B6, B9 and B10, which share the motion vector for block B5, are assigned to group 2. Block B12 is assigned to group 3, block B13 is assigned to group 4, and block B14 is assigned to group 5. Each of these blocks has a unique motion vector that is not shared by any other blocks in frame 200.

The accuracy of the motion vector of blocks in group 1 may have a significant impact on image compression efficiency and quality because of the large number of blocks sharing that motion vector. By contrast, the accuracy of the motion vector for the individual blocks in groups 3, 4 and 5 may have a smaller impact on image compression efficiency and quality. Consequently, more sophisticated second pass searches are done on one or more of the blocks in group 1 in order to find more accurate motion vectors for those blocks. Similarly, more sophisticated second pass searches may also be performed for one or more of the blocks in group 2 to find more accurate motion vectors for the blocks in group 2. As discussed previously, more sophisticated searches can be made by using a more precise matching criterion, or searching at more search locations, over a larger search range, and/or at finer (e.g., sub-pixel) granularity. As such, the more sophisticated searches may also be more computationally complex. Other searches are also available that provide increased sophistication using other factors in lieu of or in addition to these parameters.

The second pass searches can be performed during the second pass of encoding to find more accurate motion vectors to be used in encoding the final bitstream. Because they are meant to be more accurate, the second pass searches may be more sophisticated than the searches performed during the first pass. However, the overall encoding complexity can still be reduced while providing better motion estimation results because the more sophisticated second pass searches are not performed on all blocks in the frame. Rather, the more sophisticated searches are only performed on one or more blocks in groups having a large number of blocks.

Returning to FIG. 5, after the blocks have been assigned to groups, a group having a number of blocks greater than one is selected (110). In other embodiments, the threshold number of blocks needed by a group in order for that group to be selected can be any other suitable number. For example, if the threshold is five, only groups that have a block sharing a motion vector with at least four other neighboring blocks will be selected.

Groups having blocks with unique motion vectors may not be selected at 110. Blocks in these groups can, for example, use the motion vector that was determined during the first pass of encoding. In other embodiments, a second simple search can be performed for blocks in these groups during the second pass rather than using the motion vector that was determined during the first pass of encoding.

Once a group has been selected, a search scheme is selected based on the number of blocks in the group (112). The larger the number of blocks in a group the larger the percentage area the group will occupy in the frame. For example, in one embodiment, a group with half of the total number of blocks in a frame will occupy 50% of the frame. Accordingly, if a group has a large number of blocks, a more sophisticated second pass search scheme that will yield a higher accuracy search can be selected. If a group has a smaller number of blocks, a less sophisticated second pass search scheme that will yield a lower accuracy search can be selected. However, this less sophisticated search scheme can still be more sophisticated than the search scheme that was performed during the first pass. Of course, there may be any number of sophistication/accuracy levels corresponding to the number of blocks. For example, using the exemplary threshold calculations below, any one of three different second pass search schemes can be selected depending on the percentage of a frame occupied by blocks in the group.

| Area Percentage of Frame | Search Scheme Selected |
|---|---|
| (0%-10%] | Lower sophistication |
| (10%-20%] | Medium sophistication |
| (20%-100%] | Higher sophistication |

Of course, although three levels are shown, any number of levels is possible. Further, in other embodiments, there may only be one second pass search scheme selected that can be applied for all the groups. In other embodiments, different criteria can be used to determine which groups receive more sophisticated second pass searches. For example, only the group with the highest number of blocks, or the first and second highest number of blocks, can be selected for receiving more sophisticated second pass searches.

Once the second pass search scheme has been selected, the second pass search is performed on one or more blocks in the group (114). In one embodiment, the second pass search is performed on all of blocks in the group. In another embodiment, the second pass search is performed on less than all of blocks (e.g. one of the blocks) in the group. The blocks that are not subject to the second pass search can re-use the motion vector from the first pass search, or can re-use motion vectors from blocks that were subject to the second pass search.

In one embodiment, the selected second pass search scheme can include comparing a block in the group against each location in the search window. In other words, the matching criterion is calculated at each possible search location in the search window, and the search location having the best matching criterion is determined to be the best match. Once the second pass search has been performed on one or more blocks in the group, the blocks are updated with the motion vector generated from the new search (i.e. the updated motion vector) (116). This motion vector can, for example, be more accurate than the motion vector that was determined during the first pass. This increased accuracy can be a result of, for example, the second pass search scheme using more search locations, sub-pixel level search granularity, or any other parameter. If the selected second pass search scheme is performed on one block in the group, as discussed previously, each of the remaining blocks in the group can be updated with the motion vector that resulted from that second pass search.

Once the second pass search has been performed and the blocks in the group have been updated with updated motion vectors (if necessary), the process determines if there are additional groups for which a second pass search should be performed (118). If there are additional groups, the next group is selected (120) and a search scheme for the next group based on the number of blocks in the group (112). After the search scheme is selected for the next group, the process continues as described above. If there are no additional groups, the process ends.

In one implementation, process steps 102, 104, 106 and 108 can be performed during the first pass of encoding while process steps 110, 112, 116, 116, 118 and 120 can be performed during the second pass of encoding. In other words, the coarse motion estimation search, and the analysis and grouping of blocks based on the motion vectors found during the coarse motion estimation search can be performed during the first pass, while the more sophisticated motion estimation searches can be performed during the second pass. However, this is merely exemplary For example, additional passes such as a third pass can be implemented in encoder 20 to perform even more sophisticated and extensive motion estimation searches on the groups relative to the searches that were performed during the first and second passes. Further, some parts of exemplary process 100, as discussed previously do not have to be performed during any pass and may be performed by an external source.

The embodiments of encoder 20 and/or decoder 42 (and the algorithms, methods, instructions etc. stored thereon and/or executed thereby) can be realized in hardware, software, or any combination thereof including, for example, IP cores, ASICS, programmable logic arrays, programmable logic controllers, microcode, firmware, microcontrollers, microprocessors, digital signal processors or any other suitable implementation. Further, portions of encoder 20 and/or decoder 42 do not necessarily have to be implemented in the same manner. Thus, for example, intra/inter prediction stage 26 can be implemented in software whereas transform stage 28 can be implemented in hardware.

Encoder 20 and/or decoder 42 can be implemented in whole or in part by one or more computers, servers, processors or any other suitable computing devices or systems that can carry out any of the embodiments described herein. In one embodiment, for example encoder 20 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms and/or instructions described herein.

Further, all or a portion of embodiments of the present invention can take the form of a computer program product accessible from, for example, a computer-usable or computer-readable medium. A computer-usable or computer-readable medium can be any device that can, for example contain, store, communicate, and/or transport the program for use by or in connection with any computing system or device. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video signal having at least one frame with a plurality of blocks each having pixels, comprising:
   receiving motion vectors for a first block in the frame and at least some blocks neighboring the first block, wherein the received motion vectors are determined using a first motion vector search scheme;
   identifying blocks from the neighboring blocks having motion vectors that are similar to the motion vector of the first block, and assigning the first block and the identified neighboring blocks to a group;
   determining a number of blocks in the group; and
   if the number of blocks in the group is greater than a predetermined number, determining an updated motion vector for at least one of the blocks in the group using a second motion vector search scheme that is different from the first motion vector search scheme, wherein the updated motion vector differs in direction or magnitude from the motion vector determined using the first motion vector search scheme, and wherein determining the updated motion vector for at least one of the blocks in the group comprises:
    determining a plurality of errors between the at least one block and a corresponding plurality of blocks located at each possible search location in a predetermined reference frame search window,
    selecting from among the corresponding plurality of blocks a best-matching block based on the determined plurality of errors, and
    calculating the updated motion vector using the at least one block and the best-matching block.

2. The method of claim 1, wherein determining the updated motion vector includes selecting the second motion vector search scheme from a plurality of motion vector search schemes based on the number of blocks in the group.

3. The method of claim 2, wherein each of the motion vector search schemes in the plurality of motion vector search schemes have different degrees of sophistication, and the sophistication of the second search scheme is a function of the number of blocks in the group such that the more blocks in the group the greater the sophistication of the second motion vector search scheme.

4. The method of claim 3 wherein the sophistication of the motion vector search scheme depends on a motion vector search scheme parameter including at least one of block matching criteria, maximum block displacement, number of search locations or pixel level search granularity.

5. The method of claim 1, wherein determining the updated motion vector for at least one of the blocks in the group comprises:
    determining the updated motion vector for only one of the blocks in the group; and
    assigning the updated motion vector to all of the blocks in the group.

6. The method of claim 1, wherein the first motion vector search scheme is less sophisticated than the second motion vector search scheme.

7. The method of claim 1, wherein the predetermined number is a non-negative integer.

8. The method of claim 1, wherein blocks neighboring the first block include non-adjacent blocks located within a predetermined number of blocks from the first block.

9. The method of claim 1, wherein receiving the motion vectors comprises:
    receiving the motion vectors from an external source.

10. The method of claim 1, wherein receiving the motion vectors comprises:
    determining the motion vectors using the first motion vector search scheme.

11. A method for encoding a video signal having at least one frame with a plurality of blocks each having pixels, comprising:
    determining motion vectors for the plurality of blocks using a first motion vector search scheme;
    assigning neighboring ones of the plurality of blocks having motion vectors similar to a first motion vector to a first group;
    selecting a second motion vector search scheme based on the number of blocks in the first group; and
    determining an updated motion vector for at least one of the blocks in the first group using the second motion vector search scheme, wherein the updated motion vector differs in direction or magnitude from the motion vector determined using the first motion vector search scheme, and wherein determining the updated motion vector for at least one of the blocks in the group comprises:
        determining a plurality of errors between the at least one block and a corresponding plurality of blocks located at each possible search location in a predetermined reference frame search window,
        selecting from among the corresponding plurality of blocks a best-matching block based on the determined plurality of errors, and
        calculating the updated motion vector using the at least one block and the best-matching block.

12. The method of claim 11, further comprising:
    assigning neighboring ones of the plurality of blocks having motion vectors similar to a second motion vector to a second group; wherein the second motion vector is dissimilar to the first motion vector;
    selecting a third motion vector search scheme based on the number of blocks in the second group; and
    determining an updated motion vector for at least one of the blocks in the second group using the third motion vector search scheme.

13. The method of claim 12, wherein the number of blocks in the first group is greater than the number of blocks in the second group and wherein the second motion vector search scheme for the first group is more sophisticated than the third motion vector search scheme for the second group.

14. The method of claim 12, wherein the second and third motion vector search schemes are more sophisticated than the first motion vector search scheme.

15. The method of claim 12, wherein the sophistication of the first, second and third motion vector search schemes depend on a parameter.

16. The method of claim 15, wherein the parameter includes at least one of block matching criteria, maximum search displacement, block size or pixel level search granularity.

17. An apparatus for encoding a video signal having at least one frame with a plurality of blocks each having pixels, comprising:
    a memory; and
    a processor configured to execute instructions stored in the memory to:
        receive motion vectors for a first block in the frame and at least some blocks neighboring the first block, wherein the received motion vectors are determined using a first motion vector search scheme;
        identify blocks from the neighboring blocks having motion vectors that are similar to the motion vector of the first block, and assigning the first block and the identified neighboring blocks to a group;
        determine a number of blocks in the group; and
        if the number of blocks in the group is greater than a predetermined number, determine an updated motion vector for at least one of the blocks in the group using a second motion vector search scheme that is different from the first motion vector search scheme, wherein the updated motion vector differs in direction or magnitude from the received motion vector for the respective block, and wherein the processor is configured to determine the updated motion vector for at least one of the blocks in the group by:
            determining a plurality of errors between the at least one block and a corresponding plurality of blocks located at each possible search location in a predetermined reference frame search window,
            selecting from among the corresponding plurality of blocks a best-matching block based on the determined plurality of errors, and calculating the updated motion vector using the at least one block and the best-matching block.

18. The apparatus of claim 17, wherein the processor is configured to execute instructions stored in the memory to select the second motion vector search scheme from a plurality of motion vector search schemes based on the number of blocks in the group.

19. The apparatus of claim 18, wherein each of the motion vector search schemes in the plurality of motion vector search schemes have different degrees of sophistication, and the sophistication of the second motion vector search scheme is a function of the number of blocks in the group such that the more blocks in the group the greater the sophistication of the second motion vector search scheme.

20. The apparatus of claim 17, wherein the first motion vector search scheme is less sophisticated than the second motion vector search scheme.

21. An apparatus for encoding a video signal having at least one frame with a plurality of blocks each having pixels, comprising:
    means for receiving motion vectors for a first block in the frame and at least some blocks neighboring the first block, wherein the received motion vectors are determined using a first motion vector search scheme;
    means for identifying blocks from the neighboring blocks having motion vectors that are similar to the motion vector of the first block, and assigning the first block and the identified neighboring blocks to a group;
    means for determining a number of blocks in the group; and
    if the number of blocks in the group is greater than a predetermined number, means for determining an updated motion vector for at least one of the blocks in the group using a second motion vector search scheme that is different from the first motion vector search scheme, wherein the updated motion vector differs in direction or magnitude from the motion vector determined using the first motion vector search scheme, and wherein determining the updated motion vector for at least one of the blocks in the group comprises:
    determining a plurality of errors between the at least one block and a corresponding plurality of blocks located at each possible search location in a predetermined reference frame search window,
    selecting from among the corresponding plurality of blocks a best-matching block based on the determined plurality of errors, and
    calculating the updated motion vector using the at least one block and the best-matching block.

22. The apparatus of claim 21, wherein the processor is configured to execute instructions stored in the memory to select the second motion vector search scheme from a plurality of motion vector search schemes based on the number of blocks in the group.

23. The apparatus of claim 22, wherein each of the motion vector search schemes in the plurality of motion vector search schemes have different degrees of sophistication, and the sophistication of the second motion vector search scheme is a function of the number of blocks in the group such that the more blocks in the group the greater the sophistication of the second motion vector search scheme.

24. The apparatus of claim 21, wherein the first motion vector search scheme is less sophisticated than the second motion vector search scheme.

\* \* \* \* \*